US012544420B2

(12) United States Patent
Pakhomov et al.

(10) Patent No.: US 12,544,420 B2
(45) Date of Patent: Feb. 10, 2026

(54) ELECTROPORATION-TARGETED DELIVERY OF RIBOSOME INACTIVATING PROTEIN GELONIN INTO MAMMALIAN CELLS

(71) Applicant: Old Dominion University Research Foundation, Norfolk, VA (US)

(72) Inventors: Andrei Pakhomov, Norfolk, VA (US); Olga Pakhomova, Norfolk, VA (US)

(73) Assignee: OLD DOMINION UNIVERSITY RESEARCH FOUNDATION, Norfolk, VA (US)

( * ) Notice: Subject to any disclaimer, the term of this patent is extended or adjusted under 35 U.S.C. 154(b) by 0 days.

(21) Appl. No.: 19/089,650

(22) Filed: Mar. 25, 2025

(65) Prior Publication Data
US 2025/0302914 A1  Oct. 2, 2025

Related U.S. Application Data

(60) Provisional application No. 63/569,928, filed on Mar. 26, 2024.

(51) Int. Cl.
*A61P 35/00* (2006.01)
*A61K 38/16* (2006.01)
*A61K 47/68* (2017.01)
*C12N 15/82* (2006.01)

(52) U.S. Cl.
CPC ............ *A61K 38/168* (2013.01); *A61K 38/16* (2013.01); *A61K 47/6825* (2017.08); *A61P 35/00* (2018.01); *C12N 15/8206* (2013.01)

(58) Field of Classification Search
None
See application file for complete search history.

(56) References Cited

U.S. PATENT DOCUMENTS

2010/0215670 A1  8/2010  Cizeau et al.
2020/0147371 A1  5/2020  Pakhomov et al.

OTHER PUBLICATIONS

Mir, Lluis M; et al; "Introduction of Definite Amounts of Nonpermeant Molecules into Living Cells after Electropermeabilization: Direct Access to the Cytosol" Experimental Cell Research, 175, 15-25, 1988 (Year: 1988).*
Mashiba, Harukazu; et al; "Augmentation of Antiproliferative and Antitumor Effect on Human Cancer Cells in Combined Use of Electroporation with a Plant Toxin, Saporin" Cancer Biotherapy & Radiopharmaceuticals, 16, 495-499, 2001 (Year: 2001).*
Delius, Michael; et al; "Shock Wave Permeabilization with Ribosome Inactivating Proteins: A New Approach to Tumor Therapy" Experimental Cell Research, 175, 15-25, 1988) and Delius, et al (Cancer Research, 59, 5227-5232, 1999 (Year: 1999).*

* cited by examiner

*Primary Examiner* — David W Berke-Schlessel
(74) *Attorney, Agent, or Firm* — Brian J. Paul; Shutts & Bowen LLP

(57) ABSTRACT

A method of treating a target tissue area with a ribosome-inactivating protein. The method comprises injecting the target tissue area with an effective dose of a ribosome-inactivating protein and administering electroporation therapy to the target tissue area.

20 Claims, 5 Drawing Sheets

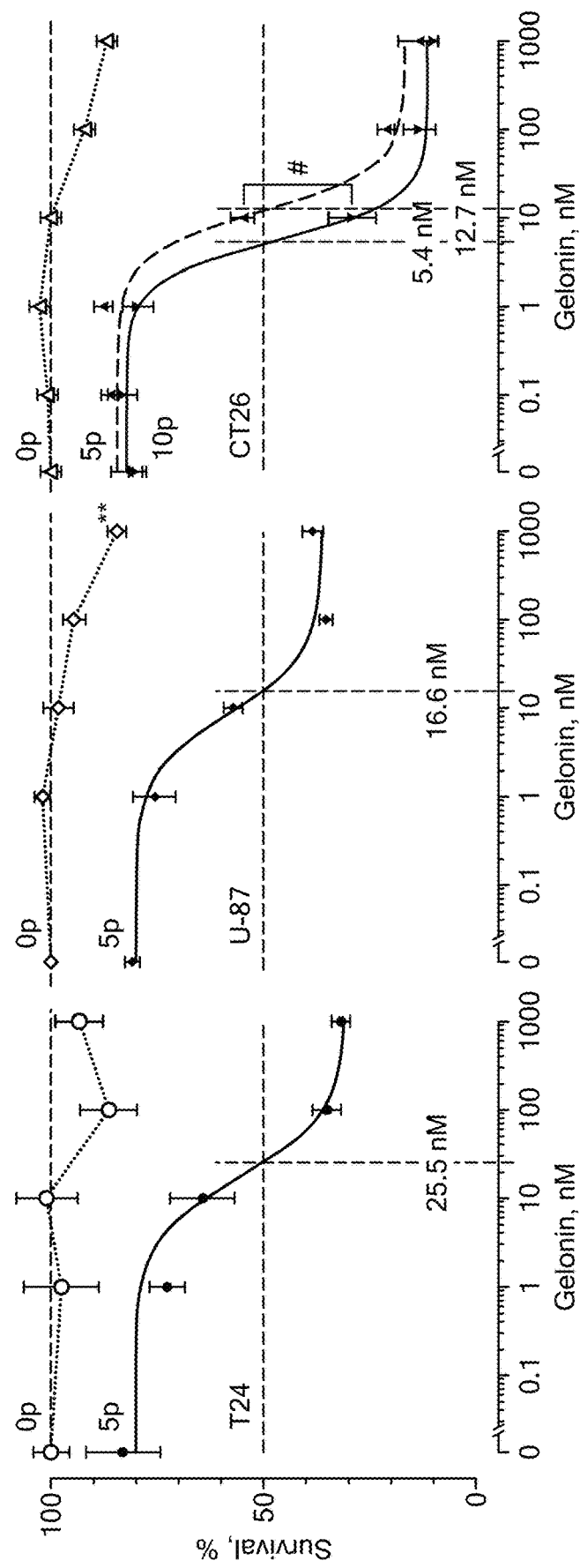

ELECTROPORATION-TARGETED DELIVERY OF RIBOSOME INACTIVATING PROTEIN GELONIN INTO MAMMALIAN CELLS

CROSS-REFERENCE TO RELATED APPLICATION(S)

The present application claims priority to U.S. Provisional Patent Application No. 63/569,928, entitled ELECTROPORATION-TARGETED DELIVERY OF RIBOSOME INACTIVATING PROTEIN GELONIN INTO MAMMALIAN CELLS, filed on Mar. 26, 2024, the entirety of which is incorporated herein by reference.

FIELD OF THE INVENTION

The present invention generally relates to systems and methods of use thereof, for the targeted delivery of type I ribosome-inactivating proteins such as Gelonin into mammalian cells for the ablation of diverse malignant and benign tissues.

BACKGROUND

Ablation of diverse malignant and benign tissues includes a variety of solid tumors and hyperplasia, such as prostate adenoma, thyroid nodes, and lymph node enlargement in Castleman's disease. It can also be used in pulsed field ablation for cardiac arrhythmias.

Gelonin is an extremely efficient plant-derived toxin. A few Gelonin molecules inside a cell are believed to be sufficient to cause cell death. However, Gelonin has poor ability to cross cell plasma membrane and remains essentially harmless outside cells. Further, Gelonin is a plant-derived type I ribosome-inactivating protein (RIP). Like all RIPs, it exhibits strong cytotoxic effects by inactivating ribosomes and blocking protein synthesis. RIPs exert their cytotoxic effects enzymatically, meaning that only a small number of toxin molecules need to reach the cytoplasm to induce a potent cytotoxic response. However, the ability of type I RIPs to reach the cytoplasm is limited. They consist of an enzymatic domain only and lack the lectin domain, which facilitates cell surface attachment and intracellular penetration of type II RIPs such as ricin. Type I RIPs may be admitted into cells by different types of endocytosis, followed by their accumulation and degradation in late endosomes and lysosomes. Their escape from lysosomal breakdown is rare, resulting in low cytotoxicity.

A combination of high intracellular toxicity with poor permeation into cells has made type I RIPs attractive to build molecular constructs that target and kill cancer cells while having low systemic toxicity. Type I RIP-based targeting toxins have been under development as cancer therapies for over three decades. In these constructs, a targeting domain such as cancer-specific antibodies, growth factors, cytokines, tumor-homing peptide, or cell-penetrating peptides, is coupled to toxin cargo. In animal and human trials, targeted toxins incorporating plant-derived type 1 RIPs showed efficacy against a range of hematologic malignancies; bladder carcinoma; hepatocellular carcinoma; and renal, ovary, breast, gastric, pancreas, non-small cell lung and colorectal cancers.

Two RIP-based drugs derived from bacterial toxins have been approved by the FDA for the treatment of hematologic malignancies. Gelonin linked to the CD33 antibody was evaluated against myeloid leukemia in phase I human trials. It showed anti-leukemia activity in just 26% of patients at the maximum tolerable dose of 28 mg/m2. Progress has been hindered by the limited availability of the conjugates and an insufficient therapeutic window between effective anti-cancer doses and toxic effects.

An alternative or a supplement to chemical targeting of RIP toxins to solid tumors could be a physical disruption of cell membranes, e.g., by sonoporation or electroporation. Applying strong pulsed electric field locally across a tumor can open the intracellular access to chemotherapeutic drugs with a low capacity to cross the intact cell membrane. This method, presently known as electrochemotherapy, has been introduced over three decades ago and progressed into an established, well-recognized treatment option. More than 40 types of tumors have been shown to respond to electrochemotherapy, including those incurable with standard chemotherapy and not suitable for excision surgery. Nearly all clinical and veterinary applications of electrochemotherapy rely on just two cytotoxic drugs, bleomycin and cisplatin, which enable a significant safety margin between effective doses and adverse off-site effects. Electroporation reduced the effective concentration to achieve 50% cell killing ($EC_{50}$) 100-5000 times for bleomycin and up to 12.5 times for cisplatin. Dozens of other cytotoxic compounds have been tested for enhanced cancer cell killing when combined with electroporation, but most showed little or no potentiation.

Bleomycin and cisplatin kill cells by inflicting DNA damage, thereby targeting predominantly the actively dividing cells, whether cancer or not. Although most tumors respond to electrochemotherapy, its efficiency varies widely. For example, in head and neck cancer, the overall response rate ranged from 0 to 100%, while the complete response rate ranged between 0 and 83.3%. The identification of new drugs whose toxicity relies on a qualitatively different mechanism and is potentiated by electroporation could expand the toolbox and the spectrum of electrochemotherapy. Gelonin targets protein synthesis, and this distinct mechanism may provide therapeutic advantages in tumors or tissues that respond poorly to bleomycin and cisplatin.

Accordingly, what is needed in the art is an electroporation protocol for the delivery of a ribosome-inactivating protein that will provide substantially improved results in the regression of cancer tumors and abnormal tissues.

SUMMARY OF THE INVENTION

The present invention provides a system and method for the treatment of malignancies, wherein the administration of a ribosome-inactivating protein in combination with electroporation has a therapeutic effect on abnormal tissue cells and tumors.

According to one or more embodiments, A method of treating a target tissue area with a ribosome-inactivating protein comprises injecting the target tissue area with an effective dose of a ribosome-inactivating protein and administering electroporation therapy to the target tissue area.

In one aspect, the electroporation therapy further comprises the administration of at least one high voltage pulse having a short duration.

In another aspect, the ribosome-inactivating protein is Gelonin having a concentration between about 1 nM and 100,000 nM.

In another aspect, the at least one high voltage pulse delivered to the target tissue area has a field strength of at least 0.001 kV/cm.

In another aspect, the short duration of the at least one high voltage pulse is at least about 300 nanoseconds.

In another aspect, the at least one high voltage pulse delivered to the target tissue area has a field strength of about 0.5 kV/cm.

In another aspect, the short duration of the at least one high voltage pulse is at least about 0.1 milliseconds.

In another aspect, the at least one high voltage pulse delivered to the target tissue area has a field strength of about 0.15 kV/cm.

In another aspect, the short duration of the at least one high voltage pulse is about 1 milliseconds.

In another aspect, the at least one high voltage pulse delivered to the target tissue area has a field strength of about 0.05 kV/cm.

According to one or more further embodiments, a method of treating a target tissue area having malignant and benign tissues comprises injecting the target tissue area with an effective dose of a ribosome-inactivating protein and administering electroporation therapy to the target tissue area. The electroporation therapy comprises the administration of at least one high voltage pulse having a duration tailored to optimize a cytotoxic effect of the ribosome-inactivating protein.

In one aspect, the ribosome-inactivating protein is Gelonin, and the effective dose is between about 1 nM and 100,000 nM.

In another aspect, the electroporation therapy includes high voltage pulses having a field strength between 0.001 kV/cm and 2 kV/cm.

In another aspect, the high voltage pulses each have a pulse duration between about 0.1 microseconds and 100 milliseconds.

In another aspect, the at least one high voltage pulse has a frequency between about 0.5 Hz and 10 MHz.

In another aspect, the at least one high voltage pulse has a pulse duration between about 1 microsecond to 100 microseconds.

In another aspect, the at least one high voltage pulse is administered to the target treatment area by at least one electrode in electrical communication with a pulse generator.

According to one or more further embodiments, a method of treating a subject having a cancerous tumor comprises injecting the cancerous tumor with an effective dose of a ribosome-inactivating protein and administering electroporation therapy to the cancerous tumor via one or more electrodes powered by a pulse generator. The electroporation therapy comprises the administration of at least one high voltage pulse having a duration suitable to optimize a cytotoxic effect of the ribosome-inactivating protein.

In one aspect, the ribosome-inactivating protein is Gelonin having a concentration between about 1 nM and 100,000 nM.

In another aspect, the at least one high voltage pulse delivered to the target tissue area has a field strength of at least 0.001 kV/cm.

In another aspect, the at least one high voltage pulse has a pulse duration of at least 0.1 microseconds and a frequency of at least 0.5 Hz.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangement and instrumentalities shown, wherein:

FIGS. 1A-1C is a graphical illustration of the potentiation of Gelonin cytotoxicity by the administration of pulsed electric field energy.

FIG. 3 is a graphical illustration of the effect of electric pulse duration on the potentiation of Gelonin cytotoxicity in mouse colon carcinoma cells, in accordance with principles of the present invention;

DETAILED DESCRIPTION

Figure 2A:
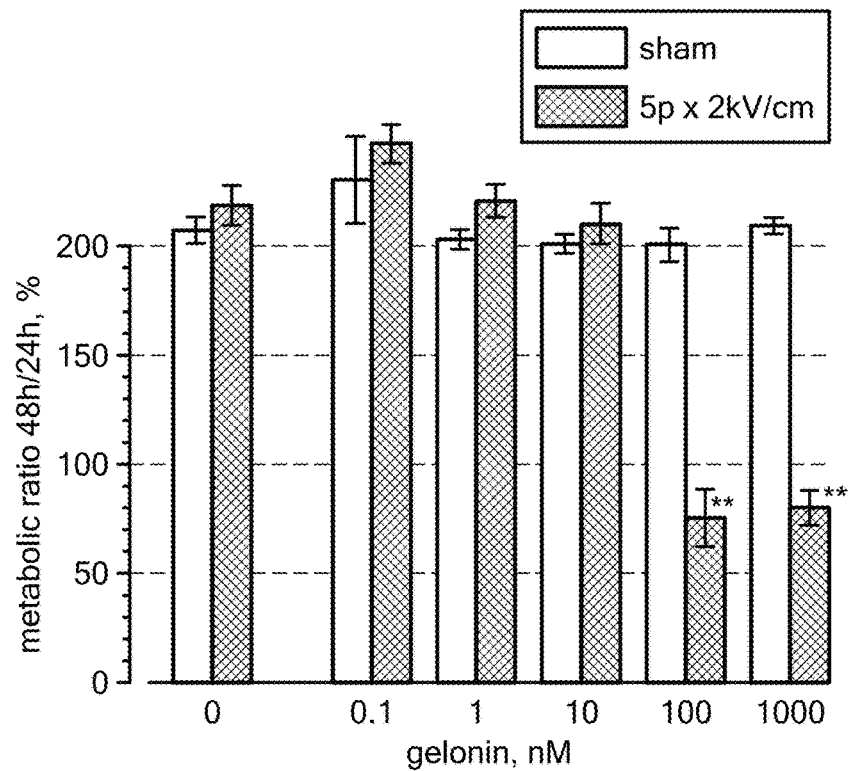
FIGS. 2A-2B is a graphical illustration of the effect of Gelonin and electroporation on the viability change from 24 to 48 hours in CT26 cells, in accordance with principles of the present invention.

The present invention advantageously provides a system, and methods of use thereof, to destroy target tissue cells or tumors utilizing electric pulse delivery and the delivery of ribosome-inactivating proteins. This will generally be accomplished by positioning electrodes proximate to a target treatment region and applying intense electric pulses to electroporate certain cells and tissues at the target treatment region between the electrodes. Gelonin, which has been previously injected into the target treatment region, will enter the electroporated cells, causing local cell death. However, Gelonin circulating in blood and tissue fluids outside the electroporated area will remain non-toxic and will eventually be eliminated from the subject. This way, targeted tissue or tumor ablation can be accomplished with little or no systemic effect of gelonin.

Materials and Methods

Cell Lines and Growth Media. Mouse colon carcinoma fibroblast cells (CT26.WT, CRL-2638), human urinary bladder carcinoma epithelial cells (T24, HTB-4), and human glioblastoma epithelial cells (U-87 MG, HTB-14) were obtained from the American Type Culture Collection (ATCC, Manassas, VA, USA). The cell lines were maintained in humidified 5% CO2 in air at 37° C. CT26 cells were cultured in RPMI-1640 medium, T24 cells in McCoy's 5A medium, and U-87 cells in EMEM medium all obtained from Corning Inc. (Corning, NY, USA). All media were supplemented with 10% fetal bovine serum (Atlanta Biologicals, Norcross, GA, USA), 100 I.U./mL penicillin, 0.1 µg/mL streptomycin (Gibco, Gaithersburg, MD, USA), and 15 mM HEPES (Sigma-Adrich, St. Louis, MO, USA).

Preparation of Samples and Experiment Protocols. On the day of the experiment, the cells were detached with 0.05% trypsin-EDTA (Gibco) and centrifuged at 120×g for 5 min. The cell pellets were resuspended in the respective growth media at 200,000 cells/mL.

Serial dilutions of gelonin (Enzo Life Sciences, Farmingdale, NY, USA) to 10× its intended concentrations were prepared on the day of the experiments in a standard physiological solution containing (in mM) 140 NaCl, 5.4 KCl, 2 CaCl2, 1.5 MgCl2, 10 HEPES, and 10 glucose (pH 7.2-7.3, 300-310 mOsm/kg, 16.4 mS/cm). The chemicals were from Sigma-Adrich and Fisher Scientific (Hampton, NH, USA). The dilutions were stored at 4° C. and added to the cell suspension at 1:9 ratio 5 min before the electric pulse or sham exposures.

After gentle mixing, 100-µL aliquots of the cell suspensions with Gelonin or vehicle added were transferred into 1-mm electroporation cuvettes (BioSmith, Vandergrift, PA, USA) and exposed to the pulsed electric field or were sham-exposed in a random order.

The cuvettes were then left for 10 min on the bench at room temperature. Afterwards, the suspension in all cuvettes was diluted with 200 µL of the complete growth medium without Gelonin and gently mixed. During the next 10 min, 200 µL of the diluted suspension was collected from each cuvette and transferred to a 96-well plate. The plate was centrifuged at 120× g for 5 min, from 20 to 25 min after the electric pulse treatment. The supernatant was removed and replaced with 100 µL of fresh complete growth medium in about 25 min after exposure.

Thus, the cells were exposed to the intended Gelonin concentration for 5 min before electroporation and 10 min after it. Incubation continued with a 3-fold lower Gelonin concentration for an additional 15 min.

The plates were transferred to a 37° C., 5% CO2 incubator until viability measurements were performed.

Pulsed Electric Field Treatments. Nearly rectangular 300-ns and 9-µs pulses from an AVTECH AVOZ-D2-B-ODA generator (AVTECH Electrosystems, Ottawa, ON, Canada) were delivered to the cuvette via a 50-to-10-Ohm transition module (AVOZ-D2-T, AVTECH Electrosystems) modified into a cuvette holder. Rectangular 100-µs pulses were from a custom-made high-voltage, low-output impedance electroporator driven by an S88K stimulator (Grass Instruments Co., Quincy, MA, USA). In all experiments, pulses were delivered at a 10-Hz repetition rate. For different pulse durations (FIG. 3), the electric field strength and pulse numbers were tuned to the isoeffective reduction of viability by 10-15% in the absence of gelonin. Pulse shape and amplitude were monitored with a TDS3052B oscilloscope (Tektronix, Wilsonville, OR, USA). The electric field values were calculated as pulse voltage over a 1-mm distance.

Viability Measurements. At 23 h after pulse treatments, 10 µL of the Presto Blue reagent (Thermo Fisher Scientific Richmond, VA, USA) was added to each well and incubation continued for 1 h at 37° C. The plates were read with a Synergy 2 microplate reader (BioTEK, Winooski, VT, USA), with ex./em. settings at 530/590 nm. The data were corrected for background fluorescence by subtracting values for the wells that contained culture medium without cells.

Figure 2B:
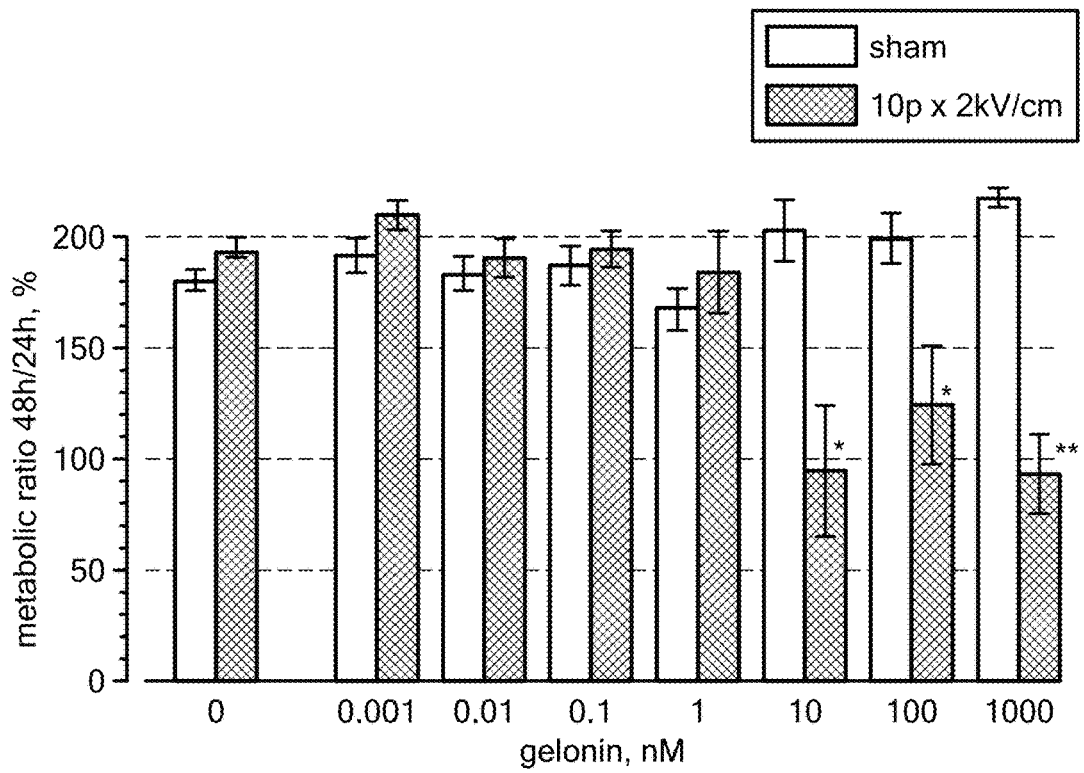

For the experiments shown in FIGS. 2A-2B, the medium with Presto Blue was replaced with the fresh medium after the readings, and the plates were returned to the incubator. The Presto Blue reagent was added again at 47 hours and viability measurements were taken at 48 hours. Viability at 48 hours was expressed relative to readings in the same well at 24 hours, taken as 100%.

Data Analysis and Statistics. Most experiments were performed at least four times. Electric pulse treatments were randomized with sham exposures, which were performed in exactly the same manner but no electric pulses were triggered. Viability measured in the sham-exposed vehicle control samples was used as a 100% reference. Graphs, prepared with Grapher 16 (Golden Software, Golden, CO, USA), present the mean data values and their standard error. Viability in the electroporated cells incubated with different gelonin concentrations was fitted with a modified Hill equation:

$$V(C_g) = V_{min} + \frac{V_{max} - V_{min}}{1 + \left(\frac{C_g}{EC_{midpoint}}\right)^n},$$

where:
  $V(C_g)$ is the viability at Gelonin concentration $C_g$;
  $V_{min}$ and $V_{max}$ are the minimum and maximum viability values;
  $EC_{midpoint}$ is the Gelonin concentration at which viability is halfway between $V_{min}$ and $V_{max}$ (if $V_{min}=0$ and $V_{max}=100\%$, $EC_{midpoint}=EC_{50}$);
  n is the Hill coefficient controlling the steepness of the curve.

In FIG. 7, the data was fitted with a power function. All fits were accomplished with Grapher, and the calculated p-values of all fits were better than 0.001. The statistical comparisons utilized appropriate versions of the t-test, as indicated in the text and figures, with Dunnett's correction when several groups were compared.

Results

Electroporation Assists Cell Killing by Gelonin. Now referring to FIG. 1, in accordance with the present invention, experiments were performed in CT26 mouse colon carcinoma fibroblast cells, T24 human urinary bladder carcinoma epithelial cells, and U-87 human glioblastoma epithelial cells. They were suspended in the respective growth media with gelonin at concentrations from 0 (vehicle control) to 1000 nM and treated by pulsed electric field in electroporation cuvettes. A pulse generator was set to deliver either a 10 Hz train of five 9-µs pulses at 2 kV/cm or no pulses (sham-exposed control). These parameters were determined in preliminary experiments as the dose that just marginally reduced cell viability, by 10-15%. Viability was measured at 24 hours (h) after pulse treatments by the conversion rate of resazurin to resorufin (Presto Blue assay). Viability measured in sham-exposed vehicle control samples was taken as a 100% reference. Viability measurements with metabolic assays like Presto Blue are generally attributed to changes in cell survival and metabolism but may also be influenced by the enzymatic activity of cell debris.

In all cell lines, the incubation with Gelonin without electroporation caused no or just modest viability reduction (shown in FIG. 1). In U-87 and CT26 cells, 1000 nM Gelonin reduced viability to 85±2% and 87±2.5%, respectively ($p<0.01$ for a difference from 100%, 2-tailed one same t-test). A lower concentration of 100 nM Gelonin reduced the viability of CT26 to 92±2% (p<0.05), with no significant effect in the other cell lines or at the lower concentrations.

Further, in accordance with the present invention, FIG. 1 demonstrates the potentiation of Gelonin cytotoxicity by pulsed electric fields in T24 (A), U-87 (B), and CT26 (C) cell lines. Viability was measured 24 hours after electroporation with 9-μs, 2 kV/cm pulses at 10 Hz. Samples were treated with 5 pulses ("5p", A-C) or 10 pulses ("10p", C) in the presence of Gelonin at 0.1-1000 nM or the vehicle (0 nM). Control samples (open symbols) underwent the same treatment, but no electric pulses were delivered (sham exposure, "0p"). Viability in the 0p group at 0 nM Gelonin was used as the 100% reference. Solid color lines are best fits for the 5p and 10p groups using the Hill equation. The effective Gelonin concentrations that reduced viability to 50% ($EC_{50}$) were measured from Hill fits and are shown by vertical dashed lines and legends above the x-axis. Mean±s.e., n=4-7. *p<0.05, **p<0.01 for the difference of sham-exposed controls from 100% (one sample, 2-tailed t-test). #p<0.01 for the difference between the 5p and 10p groups (unpaired 2 tailed t-test). Differences in viability of the electroporated and sham-exposed cells are significant at p<0.05 or better for all Gelonin concentrations (not labeled in the graphs depicted in FIG. 1).

Electroporation in the absence of Gelonin or when its concentration was at or below 1 nM reduced cell viability to 80-85%. A further increase in Gelonin concentration caused a sharp viability reduction followed by a residual resistance plateau at about 30% (T24 and U-87) or 20% (CT26). The dependence of viability of Gelonin concentration in electroporated cells had a classic S-shape appearance and could be fit with the Hill equation (correlation coefficients 0.81 in T24 and 0.95 in both U-87 and CT265 cells; p<0.0001 for all cells). The cytotoxic efficiency of the combined treatment was quantified by the effective Gelonin concentration that reduced viability to 50% ($EC_{50}$). In samples electroporated with 5 pulses, the $EC_{50}$ values measured from the fits equaled 25.5 nM, 16.6 nM, and 12.7 nM for the T24, U-87, and CT26 cells, respectively. These values could not be accurately compared to $EC_{50}$ values of Gelonin in intact cells because even its highest concentration reduced viability by just 10-15%. Instead, a conservative estimate (comparing $EC_{50}$ for the combined treatment with $EC_{90}$ for Gelonin only) indicates at least a 100-fold potentiation of Gelonin toxicity by electroporation.

In accordance with the present invention, more detailed studies focused on CT26 cells, which showed the highest Gelonin sensitivity and relatively small residual resistance (FIG. 1C). Increasing the electroporation dose to 10 pulses had just a modest effect on viability per se but strongly potentiated the toxicity of Gelonin. With 10 nM Gelonin, the viability dropped from 65.5±3.2% to 29.7±5.3% (p<0.01, 2-tailed t-test) and the $EC_{50}$ decreased to 5.4 nM.

Now referring to FIGS. 2A-2B, in accordance with the present invention, to test if the residual resistance at 100 and 1000 nM Gelonin truly reflects the metabolic activity of surviving cells, we compared viability at 24 hours and 48 hours. The measurements at 24 hours presented in FIG. 1C were used as a 100% reference. By 48 hours, the viability doubled in all intact (non-electroporated) samples regardless of Gelonin concentration, indicating normal growth of the cell population. Viability also doubled in electroporated cells incubated at Gelonin concentrations below $EC_{50}$. However, measurements in electroporated samples with Gelonin at 100 and 1000 nM (5 pulses) and at 10-1000 nM (10 pulses) did not increase or even diminish by 48 hours. This result suggests that there were no viable cells in these samples already at 24 hours and the "residual resistance" readings could be from the enzymatic activity of cell debris. It is also possible that the 24-hour measurements were from a mixed population of still dying and viable cells; then, continued destruction of the former and proliferation of the latter could offset each other, yielding 48-hour readings still around 100%. However, this balance is expected to shift towards lower readings at higher Gelonin concentrations and higher pulse numbers. The lack of any such trend in the data shown in FIGS. 2A-2B makes the second interpretation less likely.

In accordance with the present invention, FIGS. 2A-2B demonstrate the effect of Gelonin and electroporation on the viability change from 34 to 48 hour in CT26 cells. Samples were treated with 5 (FIG. 2A) or 10 (FIG. 2B) electric pulses (9-μs, 2 kV/cm) or were sham-exposed in the presence of different Gelonin concentrations (0.001-1000 nM) or vehicle (0 nM). Viability measured at 24 hour in each individual sample was taken as 100%. Mean±s.e., n=4; *p<0.05, **p<0.01 for the difference from the matching sham-exposed control group (unpaired 2-tailed t-test).

Longer Pulses Are More Efficient in Potentiating Gelonin Cytotoxicity. Shorter electric pulses expectedly require stronger electric fields and larger pulse numbers to electroporate cell membrane and influence viability. When these parameters are tuned to affect the viability similarly, shorter nanosecond-range pulses open smaller membrane pores but in larger quantities than longer micro- and millisecond pulses. Gelonin is a relatively large molecule, and it is not known if it can diffuse through electropores or requires a more complex machinery or endocytosis to enter cells. If it is admitted through the pores, longer pulses which open larger pores could be more efficient at potentiating Gelonin cytotoxicity.

This hypothesis was validated by comparing the effects of 300 ns, 9 μs, and 100 μs pulses. In preliminary experiments without Gelonin, the electric field strength and pulse numbers were tuned to the isoeffective reduction in viability by pulses of different durations.

The protocol of 8, 100-μs pulses was specifically selected to match the standard operating procedures for electrochemotherapy and facilitate future comparisons with the established treatments.

Figure 3:
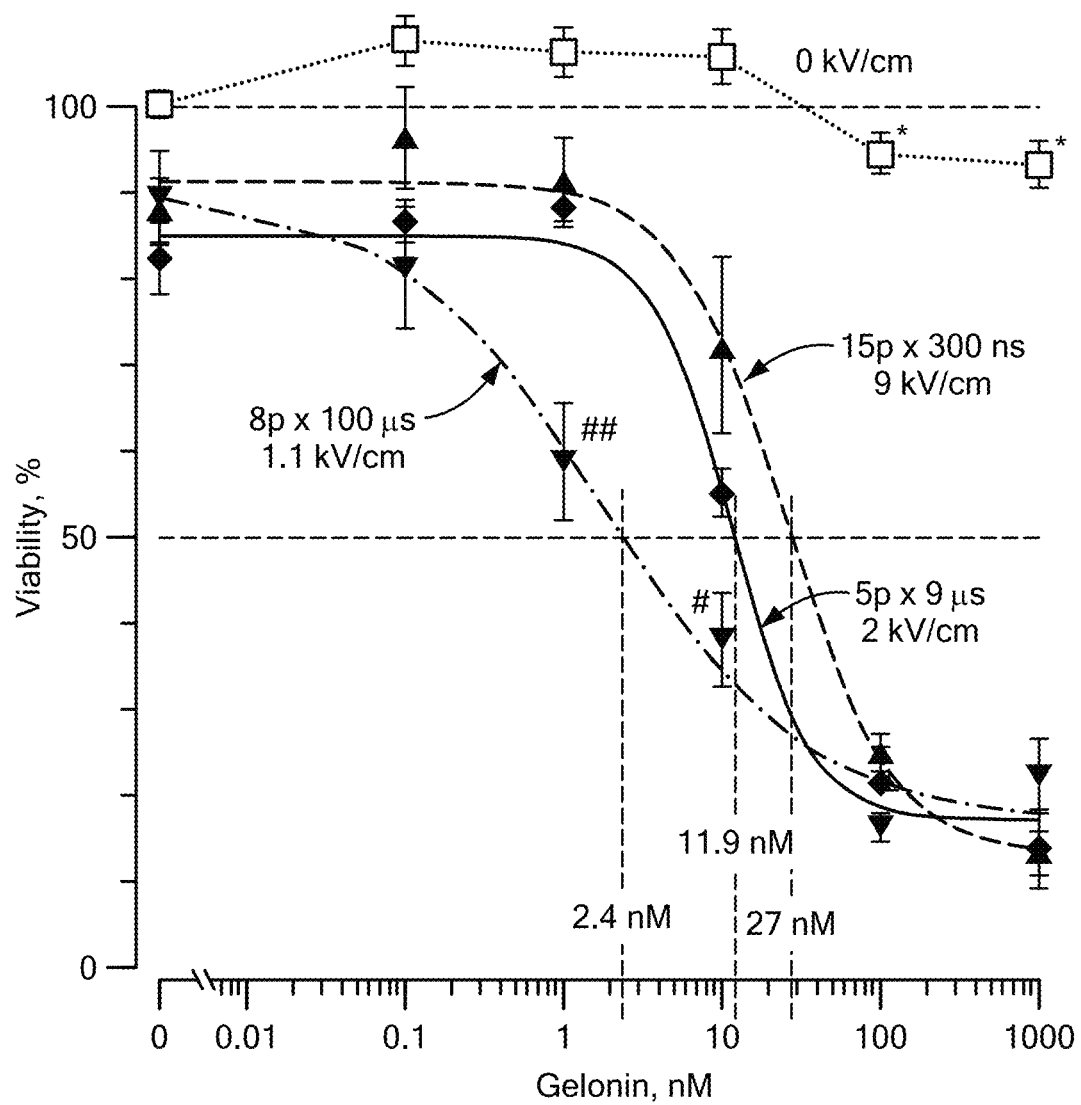
FIG. 3 illustrates the percentage survival of cells exposed to Gelonin when administered with pulsed electric field energy, in accordance with principles of the present invention.

Without Gelonin, trains of 15, 300-ns pulses at 9 kV/cm; trains of 5, 9-μs pulses at 2 kV/cm; and trains of 8, 100-μs pulses at 1.1 kV/cm all reduced cell viability to 80-90% (see FIG. 3). However, 100-μs pulses were the most efficient at reducing cell viability in the presence of 1 or 10 nM of Gelonin (p<0.01 and p<0.05, respectively; two-tailed t-test with Dunnet correction). $EC_{50}$ was also the lowest at 2.4 nM for 100-μs pulses, versus 11.9 and 27 nM for 9-μs and 300-ns pulses, respectively.

Now referring to FIG. 3, the effect of the electric pulse duration on the potentiation of Gelonin cytotoxicity in CT26 cells is shown in accordance with the present invention. Doses of 300-ns, 9-μs, and 100-μs pulses (legends) were adjusted to cause a similar reduction in viability (to 80-90%) in the absence of Gelonin. Gelonin $EC_{50}$ values (legends above x-axis) were smaller in cells electroporated by longer electric pulses. Mean±s.e., n=4 for electric pulse-treated groups. Data for sham-exposed controls (open symbols, 0 kV/cm) were pooled together for all pulse durations, n=12. #p<0.05 and ##p<0.01 for the difference between the samples treated with 100 μs pulses from those treated with either 9 μs or 300 ns pulses (unpaired 2-tailed t-test with Dunnett's correction). *p<0.05 for the difference of sham-exposed controls from 100% (one sample, 2-tailed t-test).

Synergistic Effect of the Electric Field Strength and Gelonin. Trains of 8, 100-µs pulses at 0.65, 0.9, and 1.1 kV/cm had a small or no impact of their own on cell viability but potentiated Gelonin cytotoxicity proportionally to the electric field strength (as shown in FIG. 4A). As the electric field strength increased, the minimal Gelonin concentration that significantly reduced viability (p<0.05 compared to 0 kV/cm control) diminished from 10 to 1 and 0.1 nM, respectively, and the $EC_{50}$ lowered from 157 to 4.8 and 2.2 nM. A still stronger electric field of 1.25 kV/cm reduced viability to 67±4% already without Gelonin. Viability reached the minimum of about 15% with 10 nM Gelonin and stayed at this level despite increasing the drug concentration to 100 and 1000 nM.

Figure 4B:
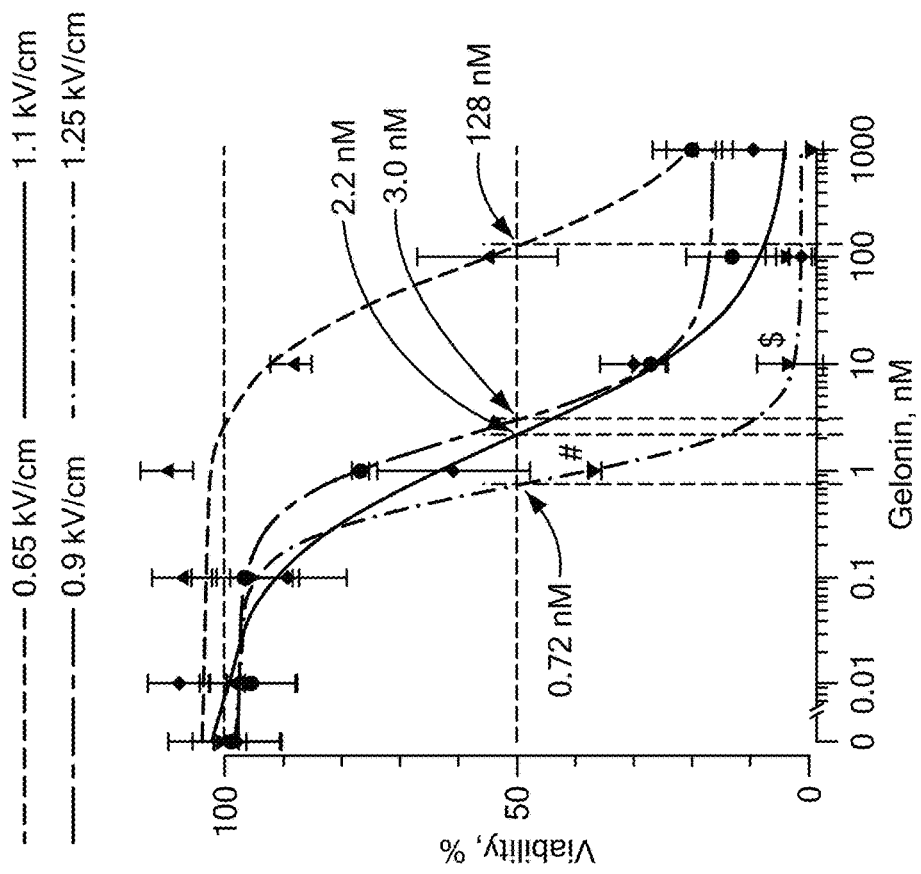
FIGS. 4A-4B are graphical illustrations of the effect of electric field strength on the potentiation of Gelonin cytotoxicity in mouse colon carcinoma cells, in accordance with principles of the present invention.
Figure 4A:
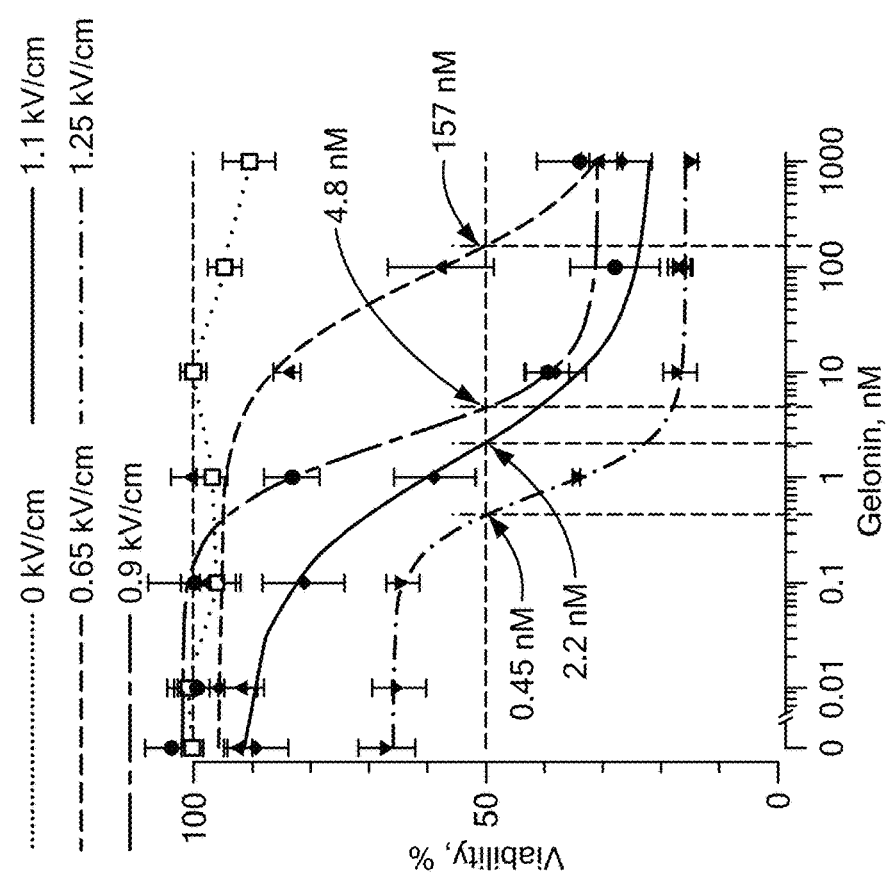

FIGS. 4A and 4B demonstrate the effect of the electric field strength on the potentiation of Gelonin cytotoxicity, in accordance with the present invention. The graphical illustration of FIG. 4A demonstrates viability measured 24 hours after exposure to 8, 100-µs pulses at the indicated electric field strengths (kV/cm) in the presence of Gelonin at 0.1-1000 nM or the vehicle (0 nM). Control samples (open symbols) were sham exposed (0 kV/cm) $EC_{50}$ values for Gelonin (nM) are labeled at the intersections of the Hill fits (solid lines) with a grid line at 50%. In FIG. 4B, the same data re-scaled between the viability of electroporated cells without Gelonin (100%) and the observed viability minimum (0%). Mean±s.e., n=4 for electric pulse-treated groups and n=16 for the pooled sham-exposed group. #p<0.05 for the difference of the 1.25 kV/cm group from all other groups (unpaired 2-tailed t-test with Dunnett's correction).

The Hill fit of viability data in cells electroporated at 1.25 kV/cm crossed the 50% viability line at 0.45 nM Gelonin. However, this value would be misleading as a Gelonin $EC_{50}$ because of the substantial reduction in viability by electroporation itself. To isolate the Gelonin toxicity, the data was recalculated using the viability of electroporated cells at 0 nM Gelonin as a 100% reference, and the lowest observed viability of 15% was assumed as a zero-viability reference for all the groups. The resulting Hill plots (FIG. 4B) are the best approximations of Gelonin cytotoxicity in cells at different electric fields strengths. Gelonin became more toxic in more severely electroporated cells. For example, 1 nM Gelonin reduced viability to 37±0.6% following electroporation at 1.25 kV/cm, compared to 61±13% after 1.1 kV/cm and 77±11.4% after 0.9 kV/cm (p<0.01, 2-tailed t-test with Dunnet's correction), and it had no toxicity after the 0.65 kV/cm exposure. Likewise, 10 nM Gelonin reduced viability to 3.9±5.2% after electroporation at 1.25 kV/cm, which was significantly (p<0.05) lower than 30.3±5.6%, 27.2±3.2, and 89±4% after the 1.1, 0.9, and 0.65 kV/cm treatments, respectively. The $IC_{50}$ followed the same trend, ranging from 0.72 nM for the most electroporated cells to 128 nM for the least injured ones.

Gelonin Potentiates Cell Inactivation by Pulsed Electric Fields. In accordance with the present invention, all preceding experiments tested how electroporation enhances the toxicity of Gelonin. Conversely, Gelonin can enhance the cytotoxicity of electroporation, reducing the number of pulses needed to achieve comparable reductions in cell viability (see FIG. 5). In this set of experiments, cell viability was measured in samples exposed to varying numbers of electric pulses (from 5 to 100, 9-µs duration, 2 kV/cm) in the presence or absence of 100 nM Gelonin. Viability decreased proportionally to the pulse number in both conditions. Same as in earlier reports, the rate of decrease followed a power function, except for the initial plateau observed without Gelonin.

Figure 5:
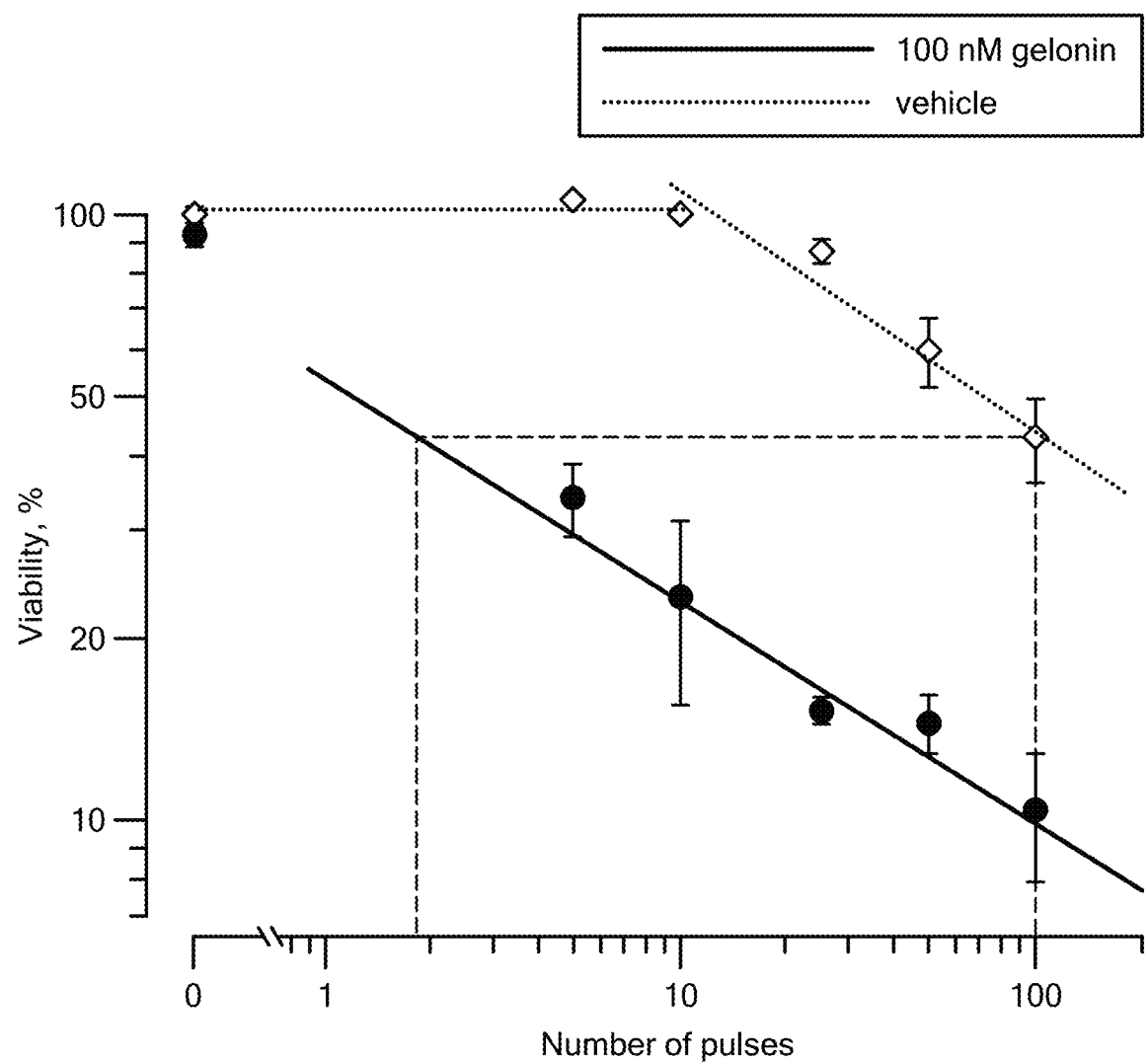
FIG. 5 is a graphical illustration of the viability of CT26 cells when measured 24 hours after exposure to different numbers of 9-μs, 2 kV/cm pulses, in the presence or absence of 100 nM Gelonin, in accordance with principles of the present invention.

As shown in FIG. 5, Gelonin potentiates cell inactivation by electroporation. Viability of CT26 cells was measured 24 hours after exposure to different numbers of 9-µs, 2 kV/cm pulses, in the presence or absence of 100 nM Gelonin (filled and open symbols, respectively). Viability in sham-exposed samples (0 pulses) without the drug was taken as 100%. Solid and dotted lines are the respective best fits of data using the power function; the initial plateau in the no-drug group was excluded from the fit. Mean±s.e., n=3-4. The difference in viability with and without Gelonin is significant at least at p<0.02 (unpaired 2-tailed t-test) for all pulse numbers. Dashed lines illustrate the estimated 50-fold difference in the pulse number to achieve the same viability reduction with and without Gelonin.

The presence of Gelonin reduced viability approximately 4.5 times, with the difference between two conditions being highly significant (p<0.02 or better for all pulse numbers). Trains of just 5 pulses with Gelonin and of 100 pulses without it reduced viability to comparable levels, 34.2±6.6% and 42.7±7.3%, respectively. When extrapolated using power function fits in FIG. 5, 100 pulses without Gelonin produced the same effect as just 2 pulses with it. Thus, the presence of 100 nM Gelonin enabled, by different estimates, a 20-to-50-fold reduction in the number of pulses required to achieve the same decline in cell viability.

The present invention demonstrates the profound potentiation of Gelonin cytotoxicity by electroporation. Cell killing could be enhanced more than 1000-fold, which is comparable to or even better than that for bleomycin, the agent that is the most widely used in electrochemotherapy. This result encourages further exploration of cell killing synergy between Gelonin and electric pulses toward novel ablation therapies, from cell lines to tissues and in vivo studies. It must be paralleled with mechanistic studies of how exactly Gelonin gets into cells and escapes endosomal entrapment; its selectivity against different cell types; and cell death pathways and their immunogenicity. While this list is long, the extensive experience with "conventional" electrochemotherapy as well as the already known systemic toxicity of Gelonin will facilitate the translation.

In contrast to bleomycin and cisplatin, which both rely on DNA damage to kill cells, Gelonin disrupts protein synthesis. This difference may account for a reduced Gelonin selectivity against certain types of cancer but can benefit ablation of slow-growing hyperplasia and non-dividing tissues where bleomycin and cisplatin would not work. An example is pulsed field cardiac ablation (PFCA), which is a novel, faster, and presumably safer technique for treating arrhythmias such as atrial fibrillation. Unlike traditional methods of thermal ablation, PFCA relies on the cardiac tissue damage being irreversible electroporation. It reduces the risks of off-site injuries but is not free of adverse side effects (e.g., due to microbubble formation). A profound reduction in the number or amplitude of pulses by combining PFCA with a brief Gelonin perfusion through coronary arteries could further speed up the procedure and bring it up to the next safety level. Although the benefits of Gelonin in PFCA ablation remain to be explored, its potential utility for cardiac ablation highlights the difference from bleomycin and cisplatin, which are not expected to potentiate the removal of non-dividing cardiac cells.

Aside from the medical prospects, the potentiation of gelonin cytotoxicity by electroporation raises questions about the fundamental molecular mechanisms of membrane permeabilization by pulsed electric fields. Gelonin molecule (~29 kDa) may be too big to enter cells by diffusion through electropores. Previous studies postulated that pulses shorter than 1 ms do not permeabilize cells for molecules with molecular mass higher than 10 kDa, yet in our experiments, even much shorter 300-ns pulses increased Gelonin toxicity more than 100-fold (FIG. 5). Multiple studies suggest that electropores open once the induced membrane potential reaches a critical level of 200-300 mV and may grow in diameter for the duration of the pulse. Consistently with this concept, Gelonin toxicity was potentiated stronger by 100-μs pulses than by either 9-μs or 300-ns pulses, suggesting that more Gelonin entered through larger pores opened by the longest pulses. However, nanosecond-duration pulses open small pores of about 1 nm in diameter, and the admittance of a 29 kDa solute with an estimated diameter of 4.1 nM is unlikely. Perhaps the incidental expansion of pores from 1 to 4 nm just by thermal fluctuation is possible, but, to our knowledge, such behavior has not been observed in molecular models or experiments. Electric pulse-mediated Gelonin entry may turn out to be a complex, multi-step process like electro-mediated gene transfer.

In summary, in accordance with the principles of the present invention described above, embodiments of the present invention provide a method of treating a target tissue area in a human patient or subject by injecting the target tissue area with an effective dose of a ribosome-inactivating protein (i.e., Gelonin) and administering electroporation therapy to target tissue area to potentiate the cytotoxic effects of Gelonin, which can be injected at a concentration of 1 nM to 100,000 nM. As a non-limiting example, in one or more embodiments the target tissue area can include malignant and benign tissues (including cancerous tumors). According to one or more embodiments, the concentration of Gelonin can also be between 50 nM to 5,000 nM or, in some cases, 10 nM to 10,000 nM. The electroporation therapy further comprises the administration of at least one high voltage pulse having a short duration. According to one or more embodiments, when treating human tissue, the short duration can be between 1 nanosecond to 5 seconds. In other embodiments, the short duration can be between 300 nanoseconds to 500 milliseconds. According to one or more embodiments, the at least one high voltage pulse delivered to the target tissue area can have a field strength of at least about 0.001 kV/cm to 50 kV/cm. It is to be understood that the electroporation therapy is administered to the target tissue area by one or more electrodes configured to deliver high voltage pulses generated by a pulse generator or other similar power supply. Further, according to one or more embodiments, the at least one high voltage pulse has a frequency between 0.5 Hz and 10 MHz. The experiments described herein above demonstrate substantially improved results in the regression of cancer tumors and abnormal tissues by potentiating the cytotoxic effects of injected Gelonin with electroporation therapy when treating a mammalian or human subject. Further it is to be understood that embodiments of the present invention are not to be limited to the principles described in this paragraph and thus can comprise any of the principles described above and in the claims below.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). For example, embodiments in accordance with principles of the present invention can include the following:

A method of treating a target tissue area with a ribosome-inactivating protein. The method comprises injecting the target tissue area with an effective dose of a ribosome-inactivating protein and administering electroporation therapy to the target tissue area.

In one aspect, the electroporation therapy further comprises the administration of at least one high voltage pulse having a short duration.

In another aspect, the ribosome-inactivating protein is Gelonin having a concentration between about 1 nM and 100,000 nM.

In another aspect, the at least one high voltage pulse delivered to the target tissue area has a field strength of at least 0.001 kV/cm.

In another aspect, the short duration of the at least one high voltage pulse is at least about 300 nanoseconds.

In another aspect, the at least one high voltage pulse delivered to the target tissue area has a field strength of about 0.5 kV/cm.

In another aspect, the short duration of the at least one high voltage pulse is at least about 0.1 milliseconds.

In another aspect, the at least one high voltage pulse delivered to the target tissue area has a field strength of about 0.15 kV/cm.

In another aspect, the short duration of the at least one high voltage pulse is about 1 milliseconds.

In another aspect, the at least one high voltage pulse delivered to the target tissue area has a field strength of about 0.05 kV/cm.

According to one or more further embodiments, a method of treating a target tissue area having malignant and benign tissues comprises injecting the target tissue area with an effective dose of a ribosome-inactivating protein and administering electroporation therapy to the target tissue area. The electroporation therapy comprises the administration of at least one high voltage pulse having a duration tailored to optimize a cytotoxic effect of the ribosome-inactivating protein.

In one aspect, the ribosome-inactivating protein is Gelonin, and the effective dose is between about 1 nM and 100,000 nM.

In another aspect, the electroporation therapy includes high voltage pulses having a field strength between 0.001 kV/cm and 2 kV/cm.

In another aspect, the high voltage pulses each have a pulse duration between about 0.1 microseconds and 100 milliseconds.

In another aspect, the at least one high voltage pulse has a frequency between about 0.5 Hz and 10 MHz.

In another aspect, the at least one high voltage pulse has a pulse duration between about 1 microsecond to 100 microseconds.

In another aspect, the at least one high voltage pulse is administered to the target treatment area by at least one electrode in electrical communication with a pulse generator.

According to one or more further embodiments, a method of treating a subject having a cancerous tumor comprises injecting the cancerous tumor with an effective dose of a ribosome-inactivating protein and administering electroporation therapy to the cancerous tumor via one or more electrodes powered by a pulse generator. The electroporation therapy comprises the administration of at least one high voltage pulse having a duration suitable to optimize a cytotoxic effect of the ribosome-inactivating protein.

In one aspect, the ribosome-inactivating protein is Gelonin having a concentration between about 1 nM and 100,000 nM.

In another aspect, the at least one high voltage pulse delivered to the target tissue area has a field strength of at least 0.001 kV/cm.

In another aspect, the at least one high voltage pulse has a pulse duration of at least 0.1 microseconds and a frequency of at least 0.5 Hz.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of ablating diverse malignant or benign tissues from a target tissue area with gelonin, the method comprising:
    injecting the target tissue area with an effective dose of gelonin to cause cell death within the target tissue area; and
    administering electroporation therapy to the target tissue area, the electroporation therapy including at least one pulse having a duration less than 1 ms.

2. The method of claim 1, wherein the electroporation therapy further comprises the administration of at least one pulse having a field strength of 9 kV/cm and a duration between 15 ns to 300 ns.

3. The method of claim 2, wherein the effective dose of gelonin is a concentration above 27 nM.

4. The method of claim 1, wherein the electroporation therapy further comprises the administration of at least one pulse having a field strength between 0.40 kV/cm and 9 kV/cm and a duration of 100 µs in the presence of 1 nM to 500 nM of gelonin.

5. The method of claim 2, wherein the duration of the at least one pulse is at least 300 ns.

6. The method of claim 1, wherein the electroporation therapy further comprises the administration of at least one pulse having a field strength of 9 kV/cm and a duration of 9 µs in the presence of gelonin having a concentration of 100 nM.

7. The method of claim 2, wherein the duration of the at least one pulse is at least 0.05 ms.

8. The method of claim 3, wherein viability of the diverse malignant and benign tissues at the target treatment area decreases when the concentration of gelonin increases between 27 nM and 500 nM and at least one pulse having a field strength of at least 0.4 kV/cm is administered to the target tissue area.

9. The method of claim 3, wherein the duration of the at least pulse is 1 ms.

10. A method of treating a target tissue area having malignant or benign tissues, the method comprising:
    injecting the target tissue area with an effective dose of a ribosome-inactivating protein;
    administering electroporation therapy to the target tissue area; and
    wherein the electroporation therapy comprises the administration of at least one pulse having a field strength of 9 kV/cm and a duration between 15 ns to 300 ns.

11. The method of claim 10, wherein the ribosome-inactivating protein is gelonin, and the effective dose is between 1 nM and 100,000 nM.

12. The method of claim 10, wherein the ribosome-inactivating protein is gelonin, and the effective dose is between 1 nM and 500 nM.

13. The method of claim 12, wherein the electroporation therapy includes pulses each having a pulse duration between 0.05 ms and 1 ms.

14. The method of claim 10, wherein the at least one pulse has a frequency between 0.5 Hz and 10 MHz.

15. The method of claim 14, wherein the at least one pulse has a pulse duration between 1 µs to 100 ms.

16. The method of claim 10, wherein the at least one pulse is administered to the target treatment area by at least one electrode in electrical communication with a pulse generator.

17. A method of treating a subject having a cancerous tumor, the method comprising:
    injecting the cancerous tumor with a dose of a ribosome-inactivating protein to effectuate cell death within the cancerous tumor;
    administering electroporation therapy to the cancerous tumor via one or more electrodes powered by a pulse generator; and
    wherein the electroporation therapy comprises the administration of at least one pulse having a field strength between 0.40 kV/cm and 9 kV/cm and a duration between 15 ns and 1 ms-suitable to optimize a cytotoxic effect of the ribosome inactivating protein.

18. The method of claim 17, wherein the ribosome-inactivating protein is gelonin having a concentration between 1 nM and 100,000 nM.

19. The method of claim 18, wherein the ribosome-inactivating protein is gelonin, and the effective dose is between 1 nM and 500 nM.

20. The method of claim 19, wherein the at least one pulse has a pulse duration of at least 0.05 ms and a frequency of at least 0.5 Hz.

* * * * *